US008502108B2

(12) United States Patent
Mohamed et al.

(10) Patent No.: US 8,502,108 B2
(45) **Date of Patent: *Aug. 6, 2013**

(54) METHOD AND DEVICE FOR CREATING A MICRO PLASMA JET

(75) Inventors: Abdel-Aleam H Mohamed, Beni-Suef (EG); Karl H. Schoenbach, Norfolk, VA (US); Robert Chiavarini, Virginia Beach, VA (US); Robert O. Price, Norfolk, VA (US); Juergen Kolb, Norfolk, VA (US)

(73) Assignee: Old Dominion University Research Foundation, Norfolk, VA (US)

( * ) Notice: Subject to any disclaimer, the term of this patent is extended or adjusted under 35 U.S.C. 154(b) by 799 days.

This patent is subject to a terminal disclaimer.

(21) Appl. No.: 12/459,806

(22) Filed: Jul. 8, 2009

(65) Prior Publication Data

US 2010/0308730 A1 Dec. 9, 2010

Related U.S. Application Data

(63) Continuation-in-part of application No. 11/141,723, filed on May 31, 2005, now Pat. No. 7,572,998.

(60) Provisional application No. 60/575,146, filed on May 28, 2004, provisional application No. 60/964,339, filed on Aug. 10, 2007, provisional application No. 60/995,661, filed on Sep. 27, 2007.

(51) Int. Cl.
*B23K 10/00* (2006.01)

(52) U.S. Cl.
USPC .............. 219/121.5; 219/121.52; 219/121.59; 315/111.21

(58) Field of Classification Search
CPC ....................................................... B23K 10/00
USPC ............... 219/121.36, 121.48, 121.5, 121.51, 219/121.52, 121.39, 121.37, 121.59, 121.54; 216/67; 315/111.21
See application file for complete search history.

(56) References Cited

U.S. PATENT DOCUMENTS 3,772,188 A 11/1973 Edwards
4,053,814 A 10/1977 Regan et al.
4,088,926 A 5/1978 Fletcher et al.
4,348,357 A 9/1982 Bithell (Continued)

FOREIGN PATENT DOCUMENTS

WO WO2006096716 9/2006

OTHER PUBLICATIONS

Koinuma, et. al., "Development and Application of a Microbeam Plasma Generator", Appl. Phys. Lett. 60(7), Feb. 17, 1992.

(Continued)

*Primary Examiner* — Mark Paschall
(74) *Attorney, Agent, or Firm* — Williams Mullen

(57) ABSTRACT

A microhollow cathode discharge assembly capable of generating a low temperature, atmospheric pressure plasma micro jet is disclosed. The microhollow assembly has two electrodes: an anode and a cathode separated by a dielectric. A microhollow gas passage is disposed through the three layers. In some embodiments, the passage is tapered such that the area at the first electrode is larger than the area at the second electrode. When a potential is placed across the electrodes and a gas is directed through the gas passage, then a low temperature micro plasma jet can be created at atmospheric pressure or above.

15 Claims, 8 Drawing Sheets

U.S. PATENT DOCUMENTS

| | | | | |
|---|---|---|---|---|
| 4,551,609 | A | | 11/1985 | Falk |
| 4,801,427 | A | | 1/1989 | Jacob |
| 4,957,606 | A | | 9/1990 | Juvan |
| 5,003,225 | A | | 3/1991 | Dandl |
| 5,026,484 | A | | 6/1991 | Juvan |
| 5,147,493 | A | | 9/1992 | Nishimura |
| 5,198,724 | A | | 3/1993 | Koinuma et al. |
| 5,272,414 | A | | 12/1993 | Iwanaga |
| 5,272,417 | A | | 12/1993 | Ohmi |
| 5,285,046 | A | | 2/1994 | Hansz |
| 5,289,085 | A | | 2/1994 | Godyak et al. |
| 5,309,063 | A | | 5/1994 | Singh |
| 5,369,336 | A | | 11/1994 | Koinuma et al. |
| 5,387,842 | A | | 2/1995 | Roth et al. |
| 5,403,453 | A | | 4/1995 | Roth et al. |
| 5,414,324 | A | | 5/1995 | Roth et al. |
| 5,456,972 | A | | 10/1995 | Roth |
| 5,569,810 | A | | 10/1996 | Tsuji |
| 5,662,266 | A | * | 9/1997 | Zurecki et al. .................... 239/8 |
| 5,680,014 | A | | 10/1997 | Miyamoto et al. |
| 5,707,594 | A | | 1/1998 | Austin |
| 5,876,663 | A | | 3/1999 | Laroussi |
| 5,883,470 | A | | 3/1999 | Hatakeyama et al. |
| 6,005,349 | A | | 12/1999 | Kunhardt et al. |
| 6,072,273 | A | | 6/2000 | Schoenbach et al. |
| 6,087,774 | A | | 7/2000 | Nakayama et al. |
| 6,177,763 | B1 | | 1/2001 | Morrow |
| 6,194,833 | B1 | | 2/2001 | DeTemple et al. |
| 6,204,605 | B1 | | 3/2001 | Laroussi et al. |
| 6,262,523 | B1 | | 7/2001 | Selwyn et al. |
| 6,433,480 | B1 | | 8/2002 | Stark et al. |
| 6,858,988 | B1 | | 2/2005 | Laroussi |
| 7,719,200 | B2 | * | 5/2010 | Laroussi .................. 315/111.81 |
| 2005/0195393 | A1 | * | 9/2005 | Karanassios .................. 356/316 |
| 2006/0028145 | A1 | * | 2/2006 | Mohamed et al. ....... 315/111.21 |
| 2006/0082319 | A1 | | 4/2006 | Eden et al. |
| 2007/0017636 | A1 | | 1/2007 | Goto et al. |
| 2007/0108910 | A1 | | 5/2007 | Eden et al. |
| 2008/0174241 | A1 | | 7/2008 | Cooper et al. |

OTHER PUBLICATIONS

Stoffels, et. al., “Plasma Needle: A Non-Destructive Atmospheric Plasma Source for Fine Surface Treatment of (bio)Materials”, Plasma Sources Science Technology 11 (2002), pp. 383-388.

Stonies, et. al., “A New Small Microwave Plasma Torch”, Plasma Sources Science Technology 13 (2004), pp. 604-611.

* cited by examiner

METHOD AND DEVICE FOR CREATING A MICRO PLASMA JET

CROSS-REFERENCE TO RELATED APPLICATION

The present application is a continuation-in-part of U.S. application Ser. No. 11/141,723, filed on May 31, 2005, which claims priority from U.S. Provisional Application No. 60/575,146, filed May 28, 2004, both of which are incorporated by reference in their entireties. This application is also a continuation-in-part of U.S. application Ser. No. 12/228,240, filed on Aug. 11, 2008, which (i) is a continuation-in-part of U.S. application Ser. No. 11/141,723, filed on May 31, 2005, which claims priority from U.S. Provisional Application No. 60/575,146, filed May 28, 2004; (ii) claims priority from U.S. Provisional Application Ser. No. 60/964,339, filed Aug. 10, 2007; and also (iii) claims priority from U.S. Provisional Application Ser. No. 60/995,661, filed Sep. 27, 2007, all of which are hereby incorporated by reference in their entireties.

STATEMENT REGARDING GOVERNMENT SUPPORT

This invention was made in part with government support under Grant No. AFOSR F49620-00-1-0079 awarded May 1, 2000 by the Air Force Office of Scientific Research. The government has certain rights in this invention.

BACKGROUND OF THE INVENTION

1. Field of the Invention

The present invention relates generally to the field of plasma devices and their uses. More particularly, this invention relates to the creation and use of a microhollow cathode, cold plasma jet discharge at atmosphere.

2. Description of the Related Art

Plasma is an electrically neutral, ionized state of gas, which is composed of ions, free electrons, and neutral species. As opposed to normal gases, with plasma some or all of the electrons in the outer atomic orbits have been separated from atoms and molecules, producing ions and electrons that are no longer be bound to one other. Typically, electrical fields can be used to create plasma by accelerating (or heating) the electrons and ionizing the gas. The charged species in a plasma will interact or couple readily with electric and magnetic fields.

Practical applications of plasmas may include plasma processing, plasma displays, surface treatments, lighting, deposition, ion doping, etc. The unique properties of plasmas enable their use as a reactant for the modification of material properties. The particular response of a material depends on the composition of the gas that is ionized/energize and the method that is used to generate the plasma. For example, plasma processing has revolutionized semiconductor manufacturing processes. Plasma edging techniques provide the means for the current level of miniaturization. Plasmas have also successfully been used for the sterilization/decontamination of surfaces. Studies found that for this application, in particular, oxygen and its compounds (hydroxyl, nitric oxide) are important components of the plasma. However, until recently most studies on the decontamination efficiency of plasmas have been conducted in low pressure environments, because larger volume plasmas can be created at lower pressure.

When the ions and electrons of a plasma are at the same temperature, then the plasma is considered to be in thermal equilibrium (or a "thermal plasma.") That is, the ions and free electrons are at a similar temperature or kinetic energy. For example, a typical thermal plasma torch used for atmospheric pressure plasma spraying may easily provide a plasma flow with temperatures between 9,000 and 13,000 K.

Non-thermal plasmas are plasmas where the electrons may be in a high state of kinetic energy or temperature, while the remaining gaseous species are at a low kinetic energy or temperature. The typical pressure for generating a non-thermal or low temperature plasma glow discharge is approximately 100 Pa. Devices that attempt to generate discharges at higher or atmospheric pressures face problems with thermal and electronic instabilities and in particular arcing within the gas and/or the electrode, sometimes leading to additional problems with electrode wear. Arcing itself constitutes the transition from a non-thermal state to a thermal plasma of high temperatures, which can damage adjacent surfaces and materials. To counteract these effects (instabilities, arcing), the linear dimension of the device may be reduced to reduce residence time of the gas in the electric field or a dielectric barrier may be inserted to separate electrodes. However, these adjustments can affect scalability and power consumption. Other cases may employ gasses intended to inhibit arcing or ionization. The field has produced few low power, atmospheric, non-thermal plasma jet capable of operating at room or near room temperature.

Some researchers have investigated the generation of non-thermal plasma discharges at atmospheric pressures. For example, a micro beam plasma generator has been described by Koinuma et al. Hideomi Koinuma et al., "Development and Application of a Microbeam Plasma Generator," Appl. Phys. Lett. 60(7), (Feb. 17, 1992). This generator produced a micro beam plasma discharge using radio frequency (RF) and ionization of a gas that flowed between two closely spaced concentric electrodes separated by a quartz tube as a dielectric. The plasma discharge temperature was 200-400C.

Stoffels et al. has disclosed a non-thermal plasma source titled a "plasma needle." E. Stoffels et al., "Plasma Needle: a non-destructive atmospheric plasma source for fine surface treatment of (bio)materials," Plasma Sources Sci. Technol. 11 (2002) 383-388. The plasma needle also used an RF discharge from a metal needle; an RF electrode is mounted axially within a gas filled, grounded cylinder to generate plasma at atmospheric pressure. Plasma appeared at the tip of the needle and its corona discharge was collected by a lens and optical fiber.

Stonies et al. recently disclosed a small microwave plasma torch based on a coaxial plasma source for atmospheric pressures. Robert Stonies et al., "A new small microwave plasma torch," Plasma Sources Sci. Technol. 13 (2004) 604-611. This torch generated a microwave induced plasma jet induced by microwaves at 2.45 GHz. Some of the features of this torch were relatively low power consumption (e.g., 20-200 W) compared to other plasma sources and its small size. However, the excitation temperature for this small plasma generator was about 4700K.

In general, micro beam generators are often limited in size by a requirement that the concentric or coaxial dielectric be limited in thickness for proper plasma generation. High pressure or atmospheric glow discharges in parallel plane electrode geometries may be prone to instabilities, particularly glow to arc transitions, and have generally been believed to be maintainable only for periods in the order of ten nanoseconds. Further, the above high pressure devices require RF or microwave signals, which can complicate practical implementation.

U.S. Pat. No. 6,262,523 to Selwyn et al. disclosed an atmospheric-pressure plasma jet with an effluent temperature no greater than 250C. This approach used planar electrodes configured such that a central flat electrode (or linear collection of rods) was sandwiched between two flat outer electrodes; gas was flowed along the plane between the electrodes while dielectric material held the electrodes in place. An RF source supplied the central electrode, which consumed 250 to 1500 W at 13.56 MHz, for an output temperature of near 100C and a flow rate of about 25-52 slpm. One function of the high flow rate is to cool the center electrode in an attempt to avoid localized emissions. This device requires Helium to limit arcing; Helium has a low Townsend coefficient so that electric discharges in Helium carry high impedance. The embodiment that employs a linear collection of rods seeks to limit arcing by creating secondary ionization within the slots between the rods, forming a form of hollow cathode effect. Although an improvement, this device requires a high flow rate of helium, along with a significant RF power input to achieve an atmospheric plasma jet near 100C.

Noble gases are generally used as the operating gas, because they facilitate the generation of stable glow discharges. In some cases, such as decontamination applications, oxygen may be mixed with the noble gas to increase efficiency; however, the level of oxygen usually does not exceed 5% of the mixture. The main reason for this low percentage is that the admixture of oxygen increases the probability of instabilities in the plasma. Conversely, the generation of a stable glow discharge in gases with higher oxygen contribution, such as air, is extremely challenging. Thus, many conventional approaches for atmospheric plasmas devices have required noble gases to avoid the uptake of admixtures of oxygen, nitrogen, and water vapor from the surrounding air, all of which would change the quality or nature of the plasma.

Another major disadvantage of conventional plasma treatment or decontamination processes, for example, is the typically very high process temperatures, which may be on the order of at least several hundred centigrade. As a consequence, most direct plasma exposures cannot be used on materials with low melting point (e.g., plastic materials), nor can they be used in many biological tissue application, such as human skin.

SUMMARY OF THE INVENTION

The present invention is a novel device and method to generate a micro plasma jet at atmospheric pressure using microhollow cathode discharges (MHCDs). For the purposes used herein, "high pressure" may be considered as at about atmospheric pressure or above. This device is capable of generating non-thermal plasma near 30C. With a plurality of such jets at atmospheric pressure, the present invention may be used as for generating stable and large volume, plasmas. Further, such MHCDs are controllable for temperature and other performance parameters, as described further herein.

MHCDs are high-pressure gas discharges in which the hollow cathode is formed by a microhollow structure, as described in U.S. Pat. No. 6,433,480 to Stark et al., which is hereby incorporated by reference. Hollow cathode discharges are very stable, in part due to a "virtual anode" that is created across the hollow. This virtual anode inhibits local increases in electron density by a corresponding reduction in voltage, reducing the likelihood of arcing. Further, the present invention may be operated with a direct current (DC) voltage on the order of hundreds of volts (up to approximately 5000V), which renders its operation simpler than devices relying on RF or microwave signals.

The present invention employs a microhollow cathode discharge assembly, preferably having at least three layers: two closely spaced but separated electrodes (e.g., a planar anode and a planar cathode separated by a planar dielectric.) A gas passage that also serves as a microhollow is disposed through the three layers. When a potential is placed across the electrodes and a gas flow is applied to the anode inlet to the gas passage then a low temperature micro plasma jet can be created at relatively high or atmospheric pressure. A wide variety of gases may be used, with the data herein generated by use of air, oxygen, and nitrogen. Preferably, the configuration of the microhollow gas passage will be tailored to the application. A variety of microhollow structures may be employed, so long as they support an acceptable hollow cathode discharge while accommodating the flow of gas. At atmospheric pressure, the discharge geometry should be sufficiently small (e.g., several hundred μm to a few mm) to generate a stable glow discharge. An increase in size may require a reduction in pressure in order to produce a stable discharge.

The present invention may be useful in any plasma application, but is specially useful for heat sensitive applications such as surface treatment, sterilization, decontamination, deodorization, decomposition, detoxification, deposition, etching, ozone generation, etc.

An aspect of the present invention is thus a device for the creation of a high pressure plasma jet in an environment having a first pressure. The device includes a first electrode, a second electrode, spaced from the first electrode, where the first and second electrodes define at least one microhollow formed through the first electrode and the second electrode. A circuit creates an electrical potential between the first electrode and the second electrode, so that the first electrode acts as a cathode and the second electrode acts as an anode, at a voltage and direct current for producing microhollow discharges in each of the at least one microhollow formed through the first electrode and the second electrode. A gas supply supplies gas at a second pressure into each of the at least one microhollow at the second electrode so as to create a gas plasma jet exiting the at least one microhollow at the first electrode, with the second pressure being greater than the first pressure across the microhollow, and the microhollow and gas supply being configured such that the gas plasma jet has a gas flow rate at about or above the critical Reynolds number. The relative configuration of electrodes may be reversed, if desired for the application, as could the direction of gas flow.

Optionally, but not necessarily, the microhollow may be tapered so that the area of the microhollow disposed in the second electrode is larger than the area of the microhollow disposed in the first electrode. In some embodiments, the first electrode and the second electrode may be plane-parallel.

Another optional aspect is that the first electrode may be separated from the second electrode by a dielectric that has at least one microhollow formed through the dielectric, similar to the at least one microhollow through the first electrode and the second electrode.

Another aspect of the present invention is a method of generating a high pressure, low temperature plasma gas jet in an environment at a first pressure. This method involves the steps of applying an electrical potential between a first electrode and a second electrode spaced from the first electrode wherein said first and second electrodes have at least one microhollow formed through the first electrode and the second electrode, such that the first electrode is a cathode and the second electrode is an anode, at a voltage and current so as to produce microhollow discharges in each of the at least one microhollow. A gas at a second pressure is provided wherein the second pressure is greater than the first pressure; another step is directing the gas through each of the at least one microhollow at the second electrode so as to create a plasma jet exiting the at least one microhollow at the first electrode with a gas flow rate at about or above the critical Reynolds number. Optionally, the first electrode may be separated from the second electrode by a dielectric including at least one microhollow formed through the dielectric similarly to the at least one microhollow through the first electrode and the second electrode. In another optional embodiment, the first electrode and the second electrode may be plane-parallel.

Another embodiment or aspect of the invention is a method for generating a high pressure plasma jet from a glow plasma discharge in an environment at a first pressure, involving the following steps: positioning a first electrode and a second electrode in a plane parallel relationship with a space therebetween; providing a dielectric between the first electrode and the second electrode; forming at least one microhollow through the first electrode, the second electrode, and the dielectric; generating an electric field between the first electrode and the second electrode, where the first electrode is a cathode and the second electrode is an anode; and providing a gas at a second pressure wherein the second pressure is greater than the first pressure; and directing the gas through each of the at least one microhollow at the second electrode so as to create a plasma jet with a gas flow rate at about or above the critical Reynolds number.

Different microhollow geometries (e.g., the diameter of the microhollow) for a given gas jet flow rate will produce plasma jets having different characteristics. On the other hand, for an embodiment having a given geometry, the temperature of the plasma jet may be controlled by the flow rate of the gas. Variations of plasma jet temperature have been observed at, for example 10 mm, from several hundred degrees to ambient or room temperature with flow rates above the critical Reynolds number for a given geometry, as described further herein. Of course, varying geometry and the gas flow rate will produce plasma jets of different characteristics.

DETAILED DESCRIPTION

The following detailed description is an example of embodiments for carrying out the invention. This description is not to be taken in a limiting sense, but is made merely for the purpose of illustrating general principles of embodiments of the invention.

Microhollow cathode discharges offer an alternative approach to generating plasma at atmospheric pressure by simple means of a direct current voltage. Plasmas are inherently 'hot,' often reaching temperatures exceeding 1000 Kelvin. Their application on heat sensitive surfaces requires the adjustment of the plasma temperature.

The present device creates a low-temperature, micro plasma jet, which is capable of operating at atmospheric pressure (i.e., a high pressure plasma jet.) This micro jet may be generated by supplying or flowing an operating gas (e.g., air or other gases) into at least one microhollow having a plasma discharge within the microhollow, such that the microhollow essentially forms a discharge canal. The at least one microhollow may be defined within first and second electrodes. A glow discharge is thus induced in an axial and lateral direction, while operating gas flows through the microhollow (i.e., or gas passage) subject to an electric field or high pressure discharge. With the concept of a microhollow cathode discharge, a stable glow discharge plasma can be generated for most gases (including air and oxygen) at atmospheric or higher pressures.

The operating gas may be chosen with respect to the desired application, for which the output of desired radicals, such as hydroxyl ions, ozone, hydrogen peroxide etc., can be maximized. In addition, radical species of the present invention may be controlled or tuned for specific applications. By operation with different gases, the device is a simple plasma-reactor producing particular radicals, such as ozone, OH, or other reaction products, depending on the operating gas selected.

An aspect of the device is the use of two plane parallel electrodes, which are spaced from each other or separated by an insulating dielectric. This dielectric may be alumina, a physical gap, or other suitable material. The electrodes define a hole or microhollow passing through both electrodes and any insulator (if applicable), which forms the microhollow cathode configuration. A cavity or opening to ambient air behind the cathode constitutes this as a hollow cathode.

Figure 1:
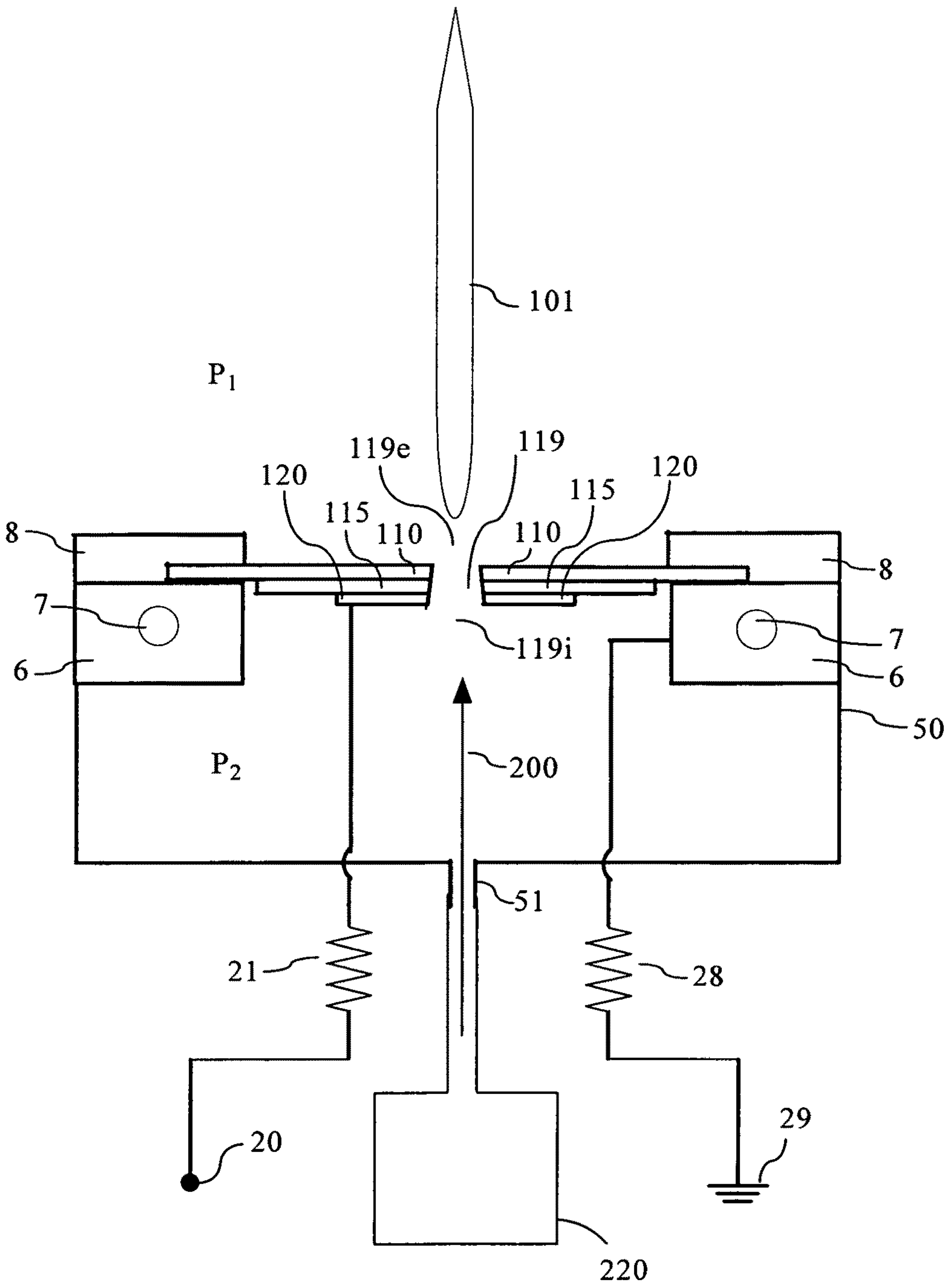
FIG. 1 shows a cross sectional view of the physical structure of an embodiment of the present invention including a supply circuit and gas chamber.
Figure 2:
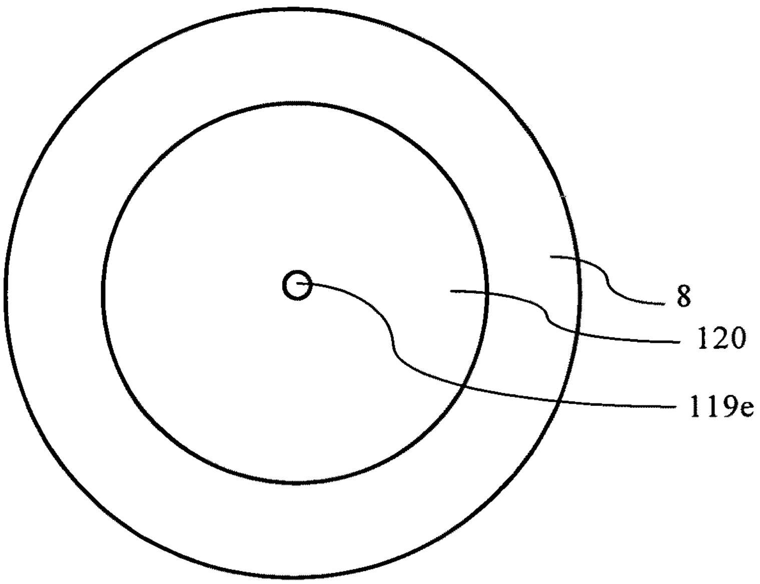
FIG. 2 illustrates a top view of a circular embodiment of the present invention.
Figure 3:
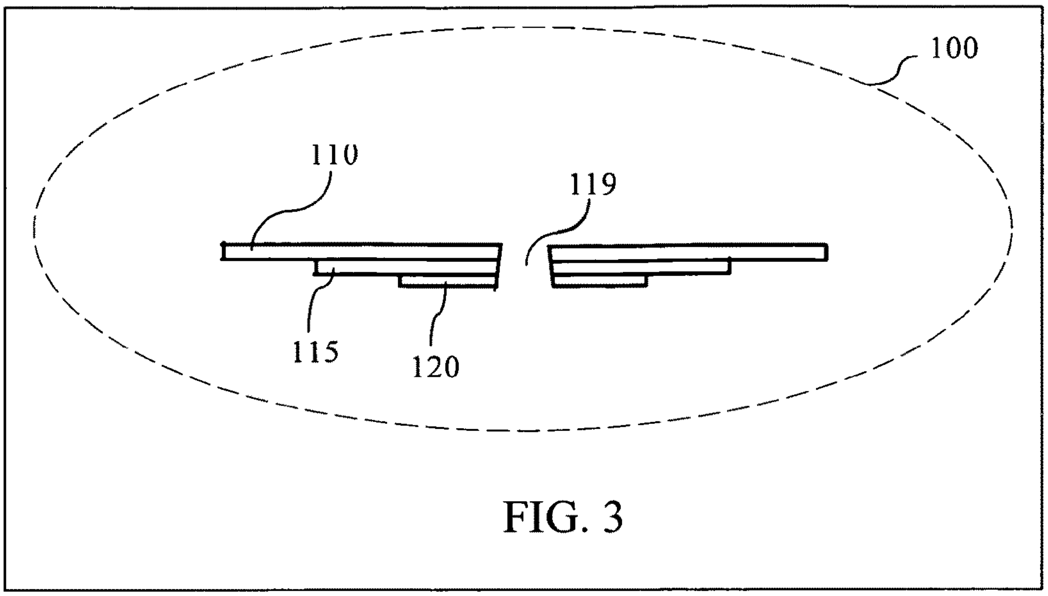
FIG. 3 shows the planar microhollow assembly layers with the microhollow gas passage.

As shown in the cross sectional view of FIG. 1, a plasma jet 101 may be produced using the present invention, preferably using a direct current potential applied to plane-parallel first electrode 110 and plane parallel second electrode 120 separated from each other and a differential pressure. FIG. 2 shows a top view of an example of present invention with second electrode 120, retaining ring 8, and microhollow gas passage exhaust 119*e*, in some embodiments also referred to as a borehole. FIG. 3 is an illustration of the components of planar microhollow assembly 100. Electrodes 110 and 120 may be fabricated from 0.25 mm thick sheets of molybdenum, although other materials and thicknesses will work as well depending on the specific application. Sheet dielectric 115, in this example made of 0.25 mm thick alumina, acts as an insulator between first and second electrodes 110 and 120. Microhollow gas passage 119 in this embodiment is a tapered channel that provides communication of gas across through an electric field formed when a potential is placed across first and second electrodes 110 and 120. The flow of gas is typically from a nozzle or chamber 5 (not shown) to the atmosphere, past the three layers of the first electrode 110, dielectric 115, and second electrode 120. With reference to FIG. 1, retaining ring 8, by threads or other fastening means known in the art, mounts onto conductive bulk 6, to fix or retain microhollow assembly 100 in place. First and second electrodes 110 and 120 are juxtaposed adjacent and parallel to sheet dielectric 11. For this example, electrode 20 is in conductive contact with conductive bulk 6. Chamber 5 may be nonconductive, insulated from conductive bulk 6 by acrylic, for inexpensive and low temperature applications, or other means, or incorporated into an electrical circuit, as is known to those in the art. Optional coolant channel 7 or other heat sink is provided to withdraw excessive heat.

The volume of the microhollow fills with a plasma when a sufficiently high direct current voltage is applied between both electrodes, creating an electrical potential between the first electrode and the second electrode, such that the first electrode is a cathode and the second electrode is an anode. The current may be adjusted to a value necessary for stable operation. The generation of a stable glow discharge inside the microhollow or discharge canal, depends in part on the gas pressure and diameter in the hole.

At high pressures, such as atmospheric pressure, a stable glow discharge can only be achieved with small microhollow diameters (e.g., usually less than about 1 millimeter). The temperatures inside the discharge canal are slightly dependent on the type of operating gas, and generally reach values between 1500 and 2000 Kelvin. Most microhollow cathode discharges have been optimized for use as radiation sources within an enclosed volume; such applications have a constant or consistent pressure across the microhollow within the enclosed volume. A few applications have attempted to flow gas through a plasma discharge at low flow rates, but these efforts have been directed to remediation of volatile organic compounds or to the generation of larger volume plasmas with high electron densities. Neither of these applications has controlled the temperature of the expelled plasma.

This description refers to an illustrative embodiment having a circular hole with diameters of 0.15-0.45 mm at the anode and 0.07-0.3 mm at the cathode, which produced a stable discharge. Other geometries for microhollow gas passages may include shaped hollows, slits, curvilinear voids, etc. A variety of microhollow structures or geometries may be employed, so long as they support an acceptable high pressure hollow cathode discharge while accommodating the flow of gas through the discharge.

The micro jet of the present invention is based on inducing a glow discharge in an axial and lateral direction while flowing air or other gases through a microhollow gas passage subject to an electric field. The jet may be operated in parallel with similar such jets for scalability to larger volume applications. As described further herein, the discharge gas temperature may be controlled as a function of gas flow rate through the microhollow structure, the applied potential across the electrodes, and the structure of the microhollow assembly.

A positive direct current power supply 20 may preferably be conductively connected to second electrode 120 via current limiting resistor 21. First electrode 110 is electrically connected to conductive bulk 6, which in turn connects to ground 29 by way of current view resistor 28. Other means of creating a potential between electrodes 110 and 120 may be used, including alternative circuit configurations or arrangements employing other currents forms. In general, first electrode 110, or the outer electrode, is grounded to form a cathode, with second sheet electrode 120, or the inner electrode being an anode. A desired breakdown voltage will be a function in part of the electrode distance and the pressure of application; the voltage may be varied within a limited range depending on the desired gas flow rate and current. The relative configuration of electrodes may be reversed, if desired for the application, as could the direction of gas flow. In other words, an embodiment in which first electrode 110 is the anode and second electrode 120 is the cathode will function similarly. Thus, this description is directed to an exemplary embodiment.

As demonstrated by arrow 200, a gas may be admitted into or blown through chamber inlet hole 51 of chamber 50 so as to create a pressure in chamber 50 that is above that of the atmospheric pressure outside of chamber 50, forming a differential pressure across passage 119. Thus, the gas enters microhollow gas passage 119 by microhollow gas passage inlet **119*i*. In some embodiments, chamber 50 may contain gas at a consistent pressure above that of atmosphere, with a consistent differential pressure across passage 119. The present invention may employ a wide variety of gases, depending on the application. As gas is admitted axially at the bottom of chamber 50, whether by pressure or by stream, a well defined micro plasma jet 101 expands into the surrounding ambient environment. In this example, such a plasma micro jet may have a diameter on the order of 1 mm; the jet may be elongated as a function of gas flow rate and microhollow dimensions. In other embodiments, chamber 50** may contain gas at a variable pressure above that of atmosphere, producing a variable differential pressure and an adjustable gas flow rate.

As gas flow rate increases (i.e., as a function of the differential pressure, the configuration of passage 119, etc.) the flow will eventually cross from laminar to turbulent flow, changing the jet characteristics. As described further herein, the discharge gas temperature may be controlled within limits as a function of gas flow rate through the microhollow structure, the applied potential across the electrodes, and the structure of the microhollow assembly. In the microhollow discharge canal, typical values for the plasma temperature (i.e., heavy particle temperature) are between 1500 and 2000 Kelvin. It has been discovered that the temperature in the afterglow plasma, which is expelled by flowing operating gas through the discharge canal, can be controlled by the gas flow rate over a wide range. Temperatures close to room temperature are achievable, enabling uses in which the afterglow plasma may be applied to heat sensitive materials and surfaces, such as skin. For a given hydraulic diameter of microhollow, the flow rate may be estimated using the D'Arcy-Weisbach or Hagen-Poisseuille equations for a given differential pressure. The flow rate is a function of the differential pressure, so increasing the pressure of the gas supply for a given geometry will be reflected in an increase in flow rate. However, computer simulation of a particular geometry is required in order to take into account accurately the effect of the singularity of plasma discharge on flow, given a plasma jet's strong gradients in temperature, pressure, and density.

Figure 5:
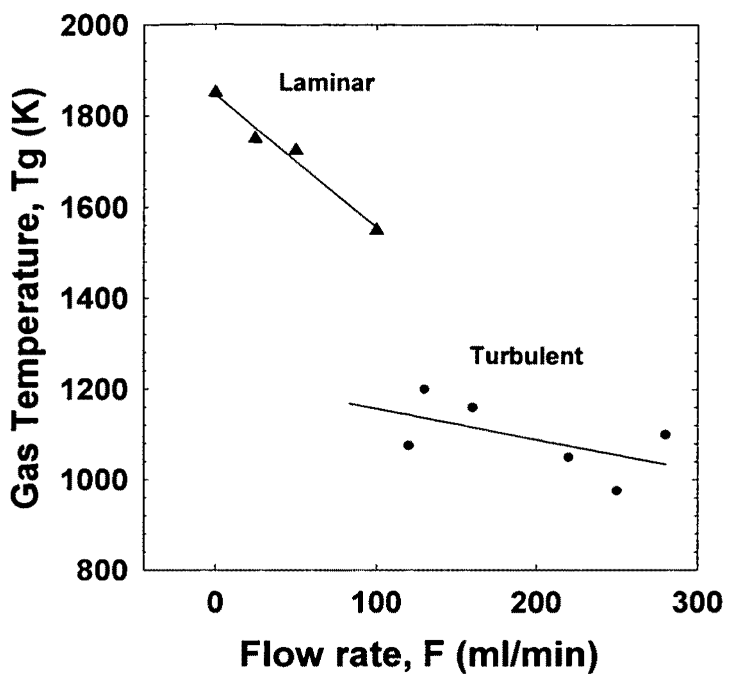
FIG. 5 shows the gas temperature measured end-on, i.e. inside the discharge, in dependence of the flow rate through the microhollow cathode discharge assembly.

The temperature of the expelled afterglow plasma can thus be adjusted by adjusting the flow rate of the operating gas with respect to the discharge geometry. As long as a laminar flow is maintained, the temperatures in the expelled afterglow plasma jet are still close to the temperature of the discharge itself. When a turbulent flow is achieved, the expelled plasma particles lose energy in collisions among each other. The increased internal friction (which in this case exceeds the inertia driving forward the flow) leads to the formation of eddies. These eddies take up cold ambient air (or other gases), which further reduces the overall temperature of the plasma jet. As a result, the temperature in the afterglow plasma jet drops significantly. This may be seen with reference to FIG. 5.

In a given geometry, such as the above described microhollow cathode, the transition to a turbulent flow means that eddies can form within the confines of this geometry, and that the dimensions of eddies are necessarily smaller than the dimensions of the discharge canal.

The relation of dimensions for eddies, and the structure that is supporting the flow of a gas or liquid, is described by the dimensionless Reynolds number, R. The Reynolds number is generally considered to be the ratio of the dynamic pressure to the shearing stress. The transition from laminar to turbulent flow is described by the critical Reynolds number, or $R_c$, for a particular geometry. Typically, the transition from laminar to turbulent flow is within a range of flow rates, with the transition being rather gradual than abrupt.

Figure 4:
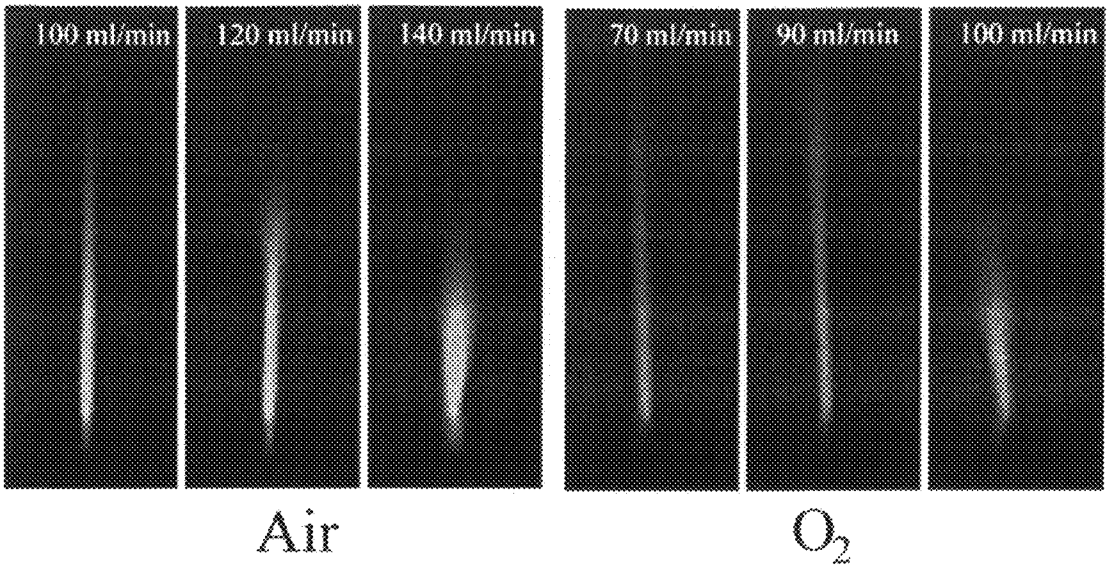
FIG. 4 includes photographs of the plasma micro jet.

Consequently, values for the Reynolds number that are clearly smaller than the critical Reynolds number, $R<R_c$, describe laminar flow characteristics, while the opposite case, $R>R_c$, categorizes turbulent flows. An exact analysis and derivation of the (critical) Reynolds number for compressible gases, which in addition have a strong temperature gradient along the flow, such as in the microhollow discharge canal can be challenging. However, a comparison of the observed flow characteristic with estimates for the flow parameters shows that, for typical microhollow cathode discharge geometry, the flow remains laminar up to a Reynolds number of about 100 and becomes turbulent for values exceeding about 300. For the operation with air, these values correspond to flow rates of less than about 120 mL/min and more than about 140 mL/min, respectively. Accordingly, the transition from laminar to turbulent flow can also be observed in the appearance of the expelled plasma jet, as shown in FIG. 4. For a flow rate just above the values required to achieve a turbulent flow, the increase in inner friction and mixing with ambient air can be observed as a broadening of the plasma plume. By further increasing the flow rate, the plasma jet resumes the appearance of well defined needle-shaped plume, with the remaining flow characteristics becoming increasingly turbulent.

For this same embodiment, but with oxygen flowing through the microhollow into ambient air, transition from laminar to turbulent flow has been observed for flow rates changing from about 90 mL/min to about 100 mL/min, as may also be seen in FIG. 4. To achieve a cold plasma jet, the transition to turbulent flow is essential. With further increasing flow rates, the temperature of the plasma jet can be reduced further, and can reach temperatures close to room temperature within a few millimeters from the microhollow cathode discharge canal. As may be seen in FIG. 5, the discharge temperature (taken end-on) decreased with an increase in gas flow rate, and dropped noticeably (e.g., approximately 350 K in this example) with the transition from laminar to turbulent flow.

Figure 6A:
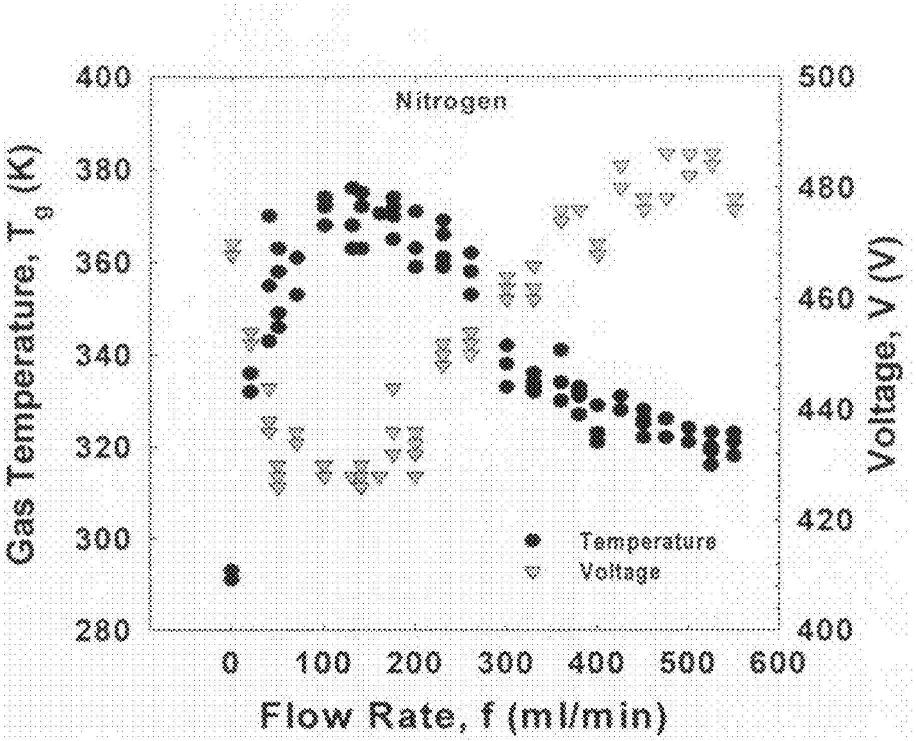
FIG. 6 illustrates the relationship among gas flow rate, temperature, and applied voltage. In these graphs, temperature is measured side-on, i.e. along a line of sight perpendicular to the direction of the flow, at 1.65 mm from anode surface.

FIG. 6A is a chart of the temperature and voltage of the discharge jet taken from the side, 1.65 mm from the anode surface, as a function of nitrogen flow rate with 7 mA current applied. Again, these results are provided for this exemplary embodiment and may change with dimensional adjustments. The temperature initially increased as a result of increasing gas flow rate, in conjunction with the the simultaneously increasing energy input, until a peak value at 140 ml/min. As the flow rate increased beyond 140 ml/min, the gas temperature then decreased. The discharge voltage demonstrated an opposite trend related to the transition from laminar to turbulent flow. Initially, as the flow rate was increased, the flow demonstrated steady laminar characteristics. As the flow approached the critical Reynolds number, $R_c$, it became unsteady. An increase in flow rate led to bursts of turbulent flow and the formation of eddies; the mixing caused by eddy currents absorbed energy and decreased the gas and plasma temperature. The increase in discharge voltage also shown in FIG. 6A resulted from an increase in the attachment of electrons to oxygen molecules as gas temperature decreased.

The gas flow rate is also relevant in that it affects the time the gas spends within the electric field. For the present embodiment, the microhollow diameter was approximately 100 μm for electrode 110 and 200 μm for electrode 120. The initial discharge current was 10 mA. The decrease in gas temperature was related in part to the decrease in residence time ($t_r$) for the gas within the microhollow or gas passage 119 while under the applied electric field. The gas flow rate (f) through gas passage 119 relates to the residence time as a function of the volume of the microhollow. For the embodiment in FIG. 5, the microhollow cross sectional area was $17.67\times10^{-3}$ $mm^2$, with a sample thickness of 1 mm, producing a volume constant (c) of approximately 0.0177 $mm^3$. The residence time may be calculated as follows:

$$t_r=c/f$$

Thus, at a flow rate of 20 ml/min the residence time is 53 μsec, while a flow rate of 200 ml/min produces a residence time of 5.3 μsec.

Figure 6B:
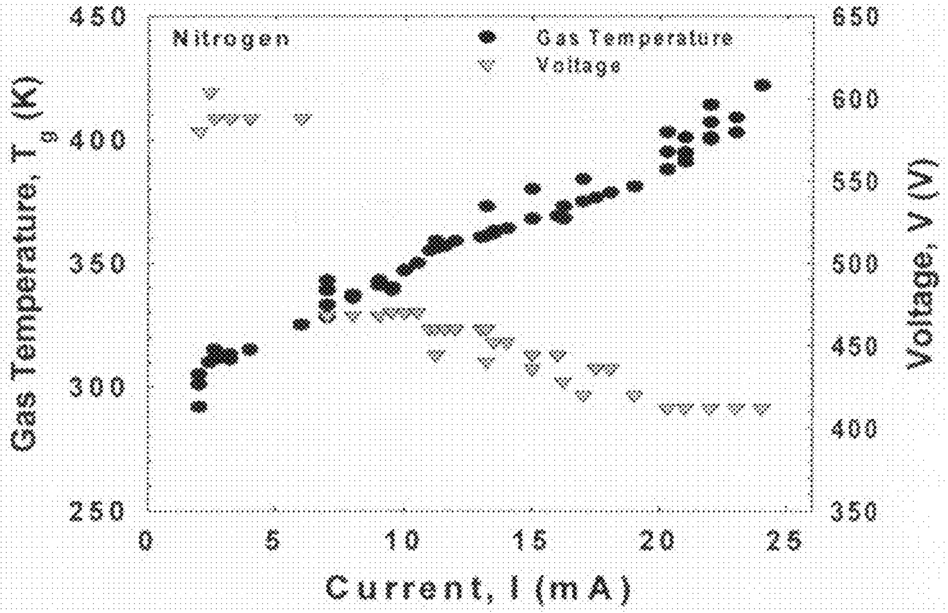

In another example, the gas discharge temperature increased linearly with discharge current for a constant nitrogen flow rate, as shown in FIG. 6B. At 1.65 mm from the surface of electrode 110, the micro plasma jet was at room temperature or 300 K, for 3 mA current and at 475 K for 22 mA; both cases taken at a flow rate of 300 ml/min of nitrogen. As may be expected, the results with air were similar. The voltage–current characteristics are shown for current ranging from 2-24 mA. For a discharge current from 2-6 mA, the discharge voltage was nearly constant at 585 V. Above 6 mA, a Townsend form of transition to a negative glow discharge dropped voltage to 465 V. From 7-20 mA, the discharge voltage decreased from 465 to 420 V, in an apparently normal glow discharge reaction. Above 20 mA, the voltage was constant at 412 V. As shown, an increase of current at a constant flow rate will produced a linear increase in gas temperature.

When gas flows into the inlet of microhollow gas passage 119*i* (i.e., disposed within the anode or second electrode 120), it is strongly activated by the electric field, which causes electron excitation, ionization, and imparts vibrational and rotational energy, as well as disassociation of the gas. As described above, a short residence time within the electric field results in a lower temperature of the plasma output. A flow of gas with a long residence time insider the electric field results in a higher temperature attributable to the efficient exchange of atoms and molecules during the residency. The jet or flow forces the gas perpendicular to electrodes 120 and 110, out the microhollow gas passage 119 and out of the electric field. As the gas flows away from the MHCD, there is relaxation, recombination, and diffusion.

The selectivity of the generated radical may be controlled by the residence time of the gas inside the electric field and the characteristics of the applied field. For example, by choice of gas and superimposing a high voltage pulse of controlled duration and field strength, the present invention may be tuned to produce plasma having desired radical species, for applications such as chemical processing, etc.

In general, two flow mechanisms operate to dissipate energy as the discharge diffuses into the surrounding environment. At atmospheric pressure in air, the collisions between electrons and heavier gas particles can cause an electron to lose up to 99.9% of its energy. (C. O. Laux, et al., $30^{th}$ AIAA Plasmadynamic and Laser Congress (1999)). In these collisions, electrons transfer their kinetic energy to nitrogen molecules, which then dissipate the energy in vibrational relaxation by a translation mode. A second mechanism is the mixing by diffusion of plasma after exiting the gas passage, which becomes more pronounced in turbulent flow.

A laminar flow exiting the passage will initially enter a transitional phase in which eddies of the surrounding, cold gases are entrained into the plasma jet, but with incomplete or limited mixing. A second phase is a departure from laminar flow as mixing of the eddies increases; ultimately, the eddies of colder gases break down, mixing with the discharge extensively and diffusing the energy of the jet.

Figure 7:
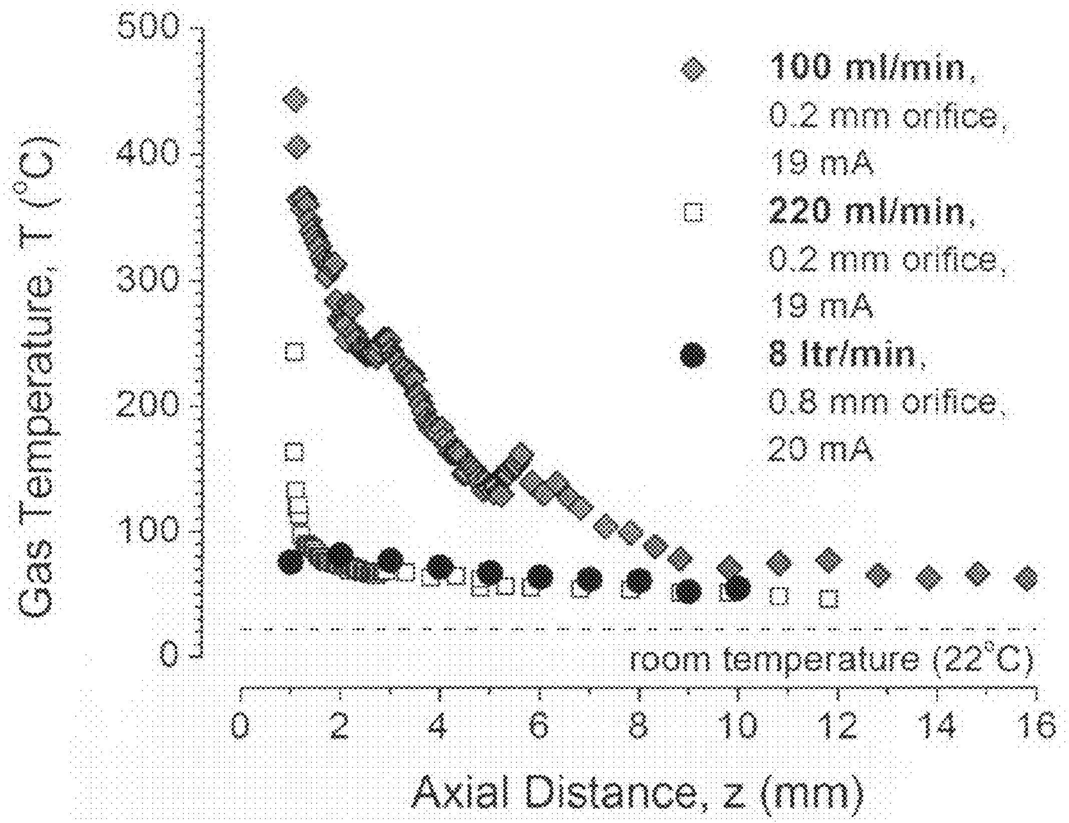
FIG. 7 is a graph of gas temperature over distance for several gas flow rates.
Figure 8:
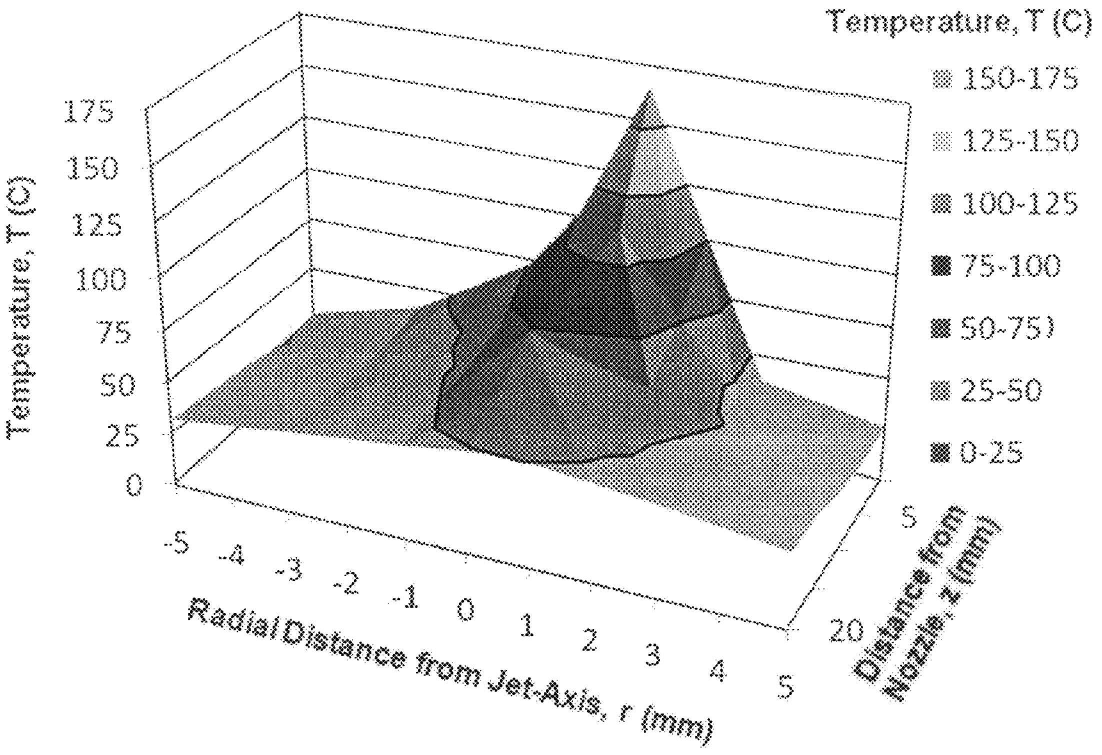
FIG. 8 is a graph of gas temperature with respect to radial distance from jet and distance from the nozzle.

FIG. 7 is a graphical comparison for the axial temperatures in the plasma jet, generated with flow rates associated with a laminar flow (100 mL/min) of air, flow rates slightly above that required to achieve laminar flow (200 mL/min), and flow rates almost hundred times higher (8 L/min). FIG. 8 is a graphical illustration of a temperature profile for the 8 L/min flow rate shows the fast decrease in temperature with an increase axial and/or radial distance. These low temperature conditions are highly desirable to exploit plasma interactions with heat sensitive materials and medical applications.

To improve the gas flow with respect to reducing the temperature in the expelled plasma jet, the gas passage through the microhollow discharge geometry may be modified to facilitate the onset of turbulent characteristics and mixing with ambient gas further. For example, the gas passage may be tapered (as illustrated herein) such that the diameter of the microhollow at the cathode may be smaller than that at the anode. This can provide a beneficial nozzle effect. Another example of an embodiment of a microhollow geometries may be a Venturi nozzle. However, embodiments having an untapered gas passage will also function satisfactorily, depending on the application, flow rate, gas, etc.

Thus, in both laminar and turbulent flow for the present invention, gas temperature is a controllable function of flow rate, structure of the microhollow gas passage, and current or the electric field. The microhollow cathode discharge generates a micro plasma jet at atmospheric pressure having a controllable temperature: an increase in flow rate reduces gas temperature while an increase in current increases gas temperature. This stable micro plasma jet described herein displayed a power consumption that varied between 1-10 W, with temperature measurements between 300 K and 1000 K, as a function of gas flow rate and discharge current.

CONCLUSION

In summary, the present invention is a microhollow cathode discharge assembly. In the illustrative embodiment, the assembly in planar form comprised a planar anode sheet; a planar cathode sheet, and a dielectric between the anode and cathode. Disposed through these sheets or layers is a microhollow gas passage; preferably, this gas passage is tapered such that the diameter at the anode is smaller than that at the cathode. When a potential is placed across the electrodes, and gas flows through the gas passage in the direction from the anode to the cathode (i.e., in the illustrated example, in the direction of the taper), a low temperature micro plasma jet can be created at atmospheric pressure.

Plasma at atmospheric pressure may have a wide range of applications, including surface treatment, medical treatment, cleaning, or purification. Selectivity of the plasma for a particular use can be controlled in part by tuning the gas temperature, the potential, and the nature of the operating gas. In addition, the generated radical species can be influenced by the choice of gas, in that some gases generate certain radical species more efficiently or effectively than others. Radical species may also be affected by the residence time of the gas inside the electric field within the microhollow and the applied field. The electric field may be pulsed or varied in duration and field strength for desired characteristics radical species. That is, the energy, radical species, and temperature may be chosen for specific application of plasma—such as plasma interaction with cancer or tumor cells.

Additionally, the jet may be combined with other such jets to form arrays to increase the scale of the applications for generating stable large volume, low temperature, atmospheric pressure air plasmas.

This contemplated arrangement may be achieved in a variety of configurations. While there has been described what are believed to be the preferred embodiment of the present invention, those skilled in the art will recognize that other and further changes and modifications may be made thereto without departing from the spirit of the invention, and it is intended to claim all such changes and modifications as fall within the true scope of the invention.

What is claimed is:

1. A device for the creation of a high pressure plasma, comprising:

a first electrode;

a second electrode, spaced from the first electrode;

wherein the first and second electrodes define at least one microhollow formed through the first electrode and the second electrode;

a circuit for creating an electrical potential between the first electrode and the second electrode, such that the first electrode is a cathode and the second electrode is an anode, at a voltage and direct current for producing high pressure microhollow discharges in each of the at least one microhollow formed through the first electrode and the second electrode;

a gas supply for supplying gas into each of the at least one microhollow at the second electrode so as to create a gas plasma jet exiting the at least one microhollow at the first electrode, and wherein the microhollow and gas supply are configured such that the gas plasma jet has a gas flow rate at about or above the critical Reynolds number.

2. The device for the creation of a high pressure plasma jet according to claim 1, wherein the gas flow rate is adjustable.

3. The device for the creation of a high pressure plasma jet according to claim 1, wherein the microhollow is tapered such that the area of the microhollow disposed in the second electrode is larger than the area of the microhollow disposed in the first electrode.

4. The device for the creation of a high pressure plasma jet according to claim 1, wherein the first electrode is separated from the second electrode by a dielectric including at least one microhollow formed through the dielectric similarly to the at least one microhollow through the first electrode and the second electrode.

5. The device for the creation of a high pressure plasma jet according to claim 1, wherein the first electrode and the second electrode are plane-parallel.

6. A method of generating a high pressure, low temperature plasma gas jet, comprising:

applying an electrical potential between a first electrode and a second electrode spaced from the first electrode wherein said first and second electrodes have at least one microhollow formed through the first electrode and the second electrode, such that the first electrode is a cathode and the second electrode is an anode, at a voltage and current so as to produce microhollow discharges in each of the at least one microhollow;

and directing a gas through each of the at least one microhollow at the second electrode so as to create a plasma jet exiting the at least one microhollow at the first electrode with a gas flow rate at about or above the critical Reynolds number.

7. The method of claim 5 wherein the first electrode is separated from the second electrode by a dielectric including at least one microhollow formed through the dielectric similarly to the at least one microhollow through the first electrode and the second electrode.

8. The method of claim 5, wherein the first electrode and the second electrode are plane-parallel.

9. A method of generating a high pressure plasma jet from a glow plasma discharge, comprising:

positioning a first electrode and a second electrode in a plane parallel relationship with a space therebetween;

providing a dielectric between the first electrode and the second electrode;

forming at least one microhollow through the first electrode, the second electrode, and the dielectric;

generating an electric field between the first electrode and the second electrode, where the first electrode is a cathode and the second electrode is an anode; and and directing a gas through each of the at least one microhollow at the second electrode so as to create a plasma jet with a gas flow rate at about or above the critical Reynolds number.

10. The method of claim 9, wherein the gas flow rate is adjustable.

11. A device for the creation of a high pressure plasma jet, comprising:

a first electrode;

a second electrode, spaced from the first electrode;

wherein the first and second electrodes define at least one microhollow formed through the first electrode and the second electrode;

a circuit for creating an electrical potential between the first electrode and the second electrode, such that the first electrode is an anode and the second electrode is a cathode, at a voltage and direct current for producing high pressure microhollow discharges in each of the at least one microhollow formed through the first electrode and the second electrode;

a gas supply for supplying gas into each of the at least one microhollow at the second electrode so as to create a gas plasma jet exiting the at least one microhollow at the first electrode, and wherein the microhollow and gas supply are configured such that the gas plasma jet has a gas flow rate at about or above the critical Reynolds number.

12. The device for the creation of a high pressure plasma jet according to claim 11, wherein the gas flow rate is adjustable.

13. The device for the creation of a high pressure plasma jet according to claim 11, wherein the microhollow is tapered such that the area of the microhollow disposed in the second electrode is larger than the area of the microhollow disposed in the first electrode.

14. The device for the creation of a high pressure plasma jet according to claim 11, wherein the first electrode is separated from the second electrode by a dielectric including at least one microhollow formed through the dielectric similarly to the at least one microhollow through the first electrode and the second electrode.

15. The device for the creation of a high pressure plasma jet according to claim 11, wherein the first electrode and the second electrode are plane-parallel.

* * * * *